June 19, 1956     B. N. INMAN     2,751,339
METHOD FOR VAPORIZING HYDROGEN PEROXIDE SOLUTIONS
Filed Dec. 1, 1951
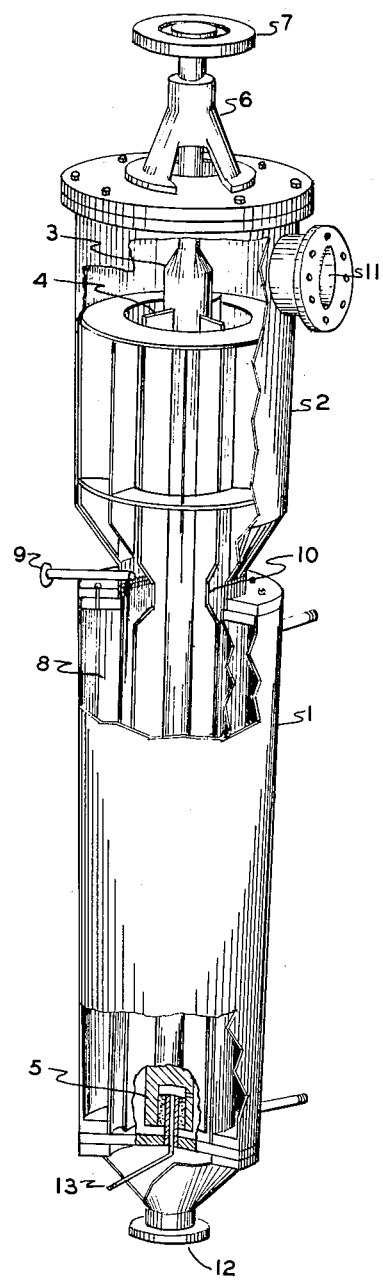
*INVENTOR.*
BYRON N. INMAN
BY
*Amos G. Cole*
AGENT

United States Patent Office 2,751,339
Patented June 19, 1956

2,751,339

METHOD FOR VAPORIZING HYDROGEN PEROXIDE SOLUTIONS

Byron N. Inman, Tonawanda Township, Erie County, N. Y., assignor to E. I. du Pont de Nemours and Company, Wilmington, Del., a corporation of Delaware Application December 1, 1951, Serial No. 259,491

10 Claims. (Cl. 202—63)

This invention relates to the vaporization of hydrogen peroxide solutions and it is an object of the invention to provide an improved method for vaporizing such solutions. A particular object is to provide an improved method for vaporizing such solutions from films thereof on heated surfaces, whereby accumulation of impurities, particularly those which catalyze peroxide decomposition, on such surfaces and in the film undergoing vaporization is prevented or inhibited to a substantial extent. A still further object is to provide a method which is well suited for vaporizing relatively unstable hydrogen peroxide solutions with excellent recoveries of the hydrogen peroxide. Still further objects will be apparent from the following description.

The above objects are accomplished in accordance with the invention by continuously providing a film of the hydrogen peroxide solution to be vaporized on a vaporizing surface heated to a temperature effective to cause vaporization from the film, while continuously removing from the vaporizing surface a substantial amount of the feed solution in unvaporized form. Practically any hydrogen peroxide solution will contain various non-volatile impurities which, though present in small or even trace amounts, actively catalyze decomposition of the hydrogen peroxide, particularly at the elevated temperatures required to effect vaporization. The harmful effects of such impurities are generally proportional to their concentration in the solution and/or on the surfaces which are contacted by the solution. It has been discovered that by continuously removing unvaporized solution from the vaporizing surface, accumulation of such harmful impurities in the film undergoing vaporization and/or on the vaporizing surface can be effectively prevented or inhibited to a practical extent with the result that decomposition of hydrogen peroxide during the vaporization due to the presence of such impurities is held to a minimum.

The amount of unvaporized solution removed from the vaporizing surface should be sufficient to prevent or inhibit to a practical extent the accumulation of such impurities in the film and/or on the vaporizing surface. Since the impurities, whose accumulation it is desired to prevent or inhibit are generally present in hydrogen peroxide solutions in but small concentrations, and frequently only as traces, removal of but a small amount of unvaporized solutions from the vaporizing surface is usually effective for the present purposes. An amount as small as about 0.5%, based on the volume of the solution fed to the film, usually has a substantial beneficial effect. Removal of somewhat larger amounts, e. g., up to about 5%, preferably about 1 to 4%, is highly beneficial and provides practical assurance against harmful accumulation of such impurities. Much larger proportions of the feed solution, e. g., up to 75% or more, can be removed if desired as unvaporized solution, particularly when solution so removed is to be recycled to the vaporizing surface. However, in such recycle operation, a substantial portion, e. g., on the order of 0.5 to about 5%, preferably 1 to 4%, based on the volume of fresh solution fed to the vaporizing surface, of the recycle stream should be purged or completely removed from the system in order to prevent or effectively inhibit accumulation of the above-mentioned impurities in the film being vaporized and/or on the vaporizing surface.

A characteristic of the present method is that peroxide solutions containing relatively small amounts of non-volatile solid material, but including the usual peroxide decomposition catalysts, e. g., unstabilized solutions, can be vaporized with excellent peroxide recoveries over long periods of time without the necessity of stopping vaporization at frequent intervals to clean the vaporizing surface. This is an important feature of the invention for when such solutions are vaporized completely from the vaporizing surface, accumulation of such catalysts requires frequent shutdowns for cleaning, otherwise decomposition soon becomes excessive and may be violent.

The vaporizing surface will generally be part of a vaporizing vessel and conveniently will be the inner walls of such vessel. Associated with the vessel will be a product recovery system of any desired type, preferably one leading to a vacuum source permitting vaporization under reduced pressure. The vaporizing surface preferably will be inclined sufficiently from the horizontal to cause a solution fed thereto to flow generally downward over the surface, thus facilitating removal of unvaporized solution from the surface. In some instances it may be advantageous to employ means such as moving vanes, scrapers or the like to effect flow of unvaporized solution from the vaporizing surface. The solution to be vaporized can be flowed onto the vaporizing surface or it can be supplied thereto in any desired manner, e. g., in finely divided form such as would be provided by the use of spray nozzles or by rapidly spinning discs onto which the solution is originally flowed. Preferably, the solution is supplied to the vaporizing surface in one or more continuous streams and is spread over the vaporizing surface in the form of a continuous film by means of rapidly moving agitators which also function to turbulently agitate the film on the vaporizing surface.

In the most preferred modification of the invention the film is turbulently agitated during vaporization. Vaporization from a turbulently agitated film proceeds rapidly with excellent heat transfer from the heated surface to the film. The film can be agitated by any means which is effective to cause turbulent flow in the films. Vibrators can be used; also agitators in the form of blades, vanes, strips, wires or the like, which are caused to cut or sweep rapidly and continuously or repeatedly through the film. When using the inclined, e. g. vertical, walls of a cylindrical vaporizing vessel as the vaporizing surface, one especially effective way of turbulently agitating the film is to rotate within the vessel at a suitable speed an agitator bearing a number of longitudinal vanes or blades whose outer edges are in such close proximity to the walls of the vessel as to continuously cut through the falling film of liquid when the agitator is rotated. If desired, such vanes or blades can be stationary and the vessel rotated, or both may be rotated in opposite directions, or in the same direction but at sufficiently different speeds to produce the same effect. It is preferred to employ a plurality of rapidly rotating longitudinal vanes within a vertical cylindrical vaporizing vessel. In such an arrangement the clearance between vane edges and the vessel walls should be sufficiently close that the vanes, upon being rotated, will continuously sweep or cut through the falling film of solution. Thus, the clearance should be less than the normal thickness of the film. Clearances of the order of 0.01 to 0.1 in. are generally suitable; a clearance of about 0.02 to 0.07 in. is preferred.

Vaporization of hydrogen peroxide solutions from turbulently agitated films is disclosed in the copending application of Schwemberger, S. N. 258,509, filed November 27, 1951.

By "turbulently agitated" it is meant that the film is agitated to such an extent or degree that turbulent flow occurs in the film, as contrasted with viscous or streamline flow. "Turbulent flow" is generally recognized as distinct from viscous flow and is used herein in accordance with its generally accepted hydrodynamic meaning.

Depending upon the concentration of hydrogen peroxide in the solution fed to the vaporizing surface and the proportion of such solution which is removed in unvaporized form from the vaporizing surface, the unvaporized solution may contain hydrogen peroxide in such high concentration as to present a safety hazard. In such cases, it is advantageous to dilute the unvaporized solution as it leaves the vaporizing surface by the addition thereto of a suitable inert diluent liquid in such an amount as will reduce the concentration of hydrogen peroxide in the resulting mixture to a concentration safe for handling. Desirably, the concentration after dilution will not exceed about 50% $H_2O_2$ by weight; preferably it will be below about 35%.

The invention is illustrated by the following examples.

*Example 1*

A vertically positioned cylindrical unit, shown in perspective in the drawing having a vaporizing section 1, 2⅜ in. I. D. by about 18 in. with a vaporizing area of 0.92 sq. ft. was employed. It included a short section 2 above the vaporizing section which functioned as an entrainment separator. Extending from top to bottom of the unit in axial alinement therewith was an agitator consisting of a shaft 3 bearing three longitudinal vanes 4 spaced equally about the shaft. The lower end of the shaft was seated in a bearing 5 positioned within the vaporizer while the upper end extended through a rotary seal (not shown) in the cover of the vaporizer and an outside bearing 6. The shaft was driven by a motor through pulleys and a belt, only one pulley 7 being shown in the drawing. The clearance between the vane edges and the vaporizer wall was 0.0375 in. A steam jacket 8 surrounded the vaporizing section and a feed line 9 was provided for delivering solution to be vaporized into the side of the unit just above the vaporizing section. Each vane was cut away slightly at a point 10 thereon adjacent the feed line. The rapid rotation of the agitator deposited the feed solution on the vaporizer wall in the form of a film. The agitator was rotated during operation at 3400 R. P. M., corresponding to a peripheral velocity for the vanes of 2047 ft./min.

The entrainment separator was provided with a vapor exit line 11 connected through a product condenser system (not shown) to a vacuum source. The bottom of the vaporizer was provided with a drain line 12 leading to a drainage container (not shown) which was also connected to the vacuum source. The walls, cover and bottom of the unit and the agitator were constructed of stainless steel.

A crude hydrogen peroxide solution made by a cyclic process involving alternately hydrogenating and oxidizing an alkylanthraquinone was vaporized in the above equipment. The solution was fed at the rate of 34.5 lbs./hr. during a 6.5 hr. period. The feed solution contained 26.0% $H_2O_2$ by weight and 0.1 g./l. of added sodium pyrophosphate decahydrate stabilizer. Steam was supplied to the steam jacket at 14 p. s. i. g. (120° C.). The vapor temperature at the vapor exit was 49° C. and the pressure 69 mm. Hg.

A small stream of water was fed to the bottom of the vaporizing section through line 13 in an amount to dilute unvaporized solution as it left the vaporizing surface to a hydrogen peroxide content of about 35% by weight. The diluted solution flowing into the drainage receiver was further diluted by water contained in the receiver to a peroxide content of around 15% by weight. The water fed to the bottom of the vaporizer not only diluted the unvaporized solution but also functioned to lubricate the lower shaft bearing and to protect the same from contact with hydrogen peroxide vapors.

The $H_2O_2$ content of the product recovered in the condensing system ranged from 26.3 to 27.17% by weight and 95.8% of the $H_2O_2$ fed was recovered in the condensate. About 1.3% by volume of the feed solution containing 3.3% of the $H_2O_2$ fed was recovered as unvaporized solution. The product was stabilized by the addition of 0.5 g./l. $NH_4NO_3$, 0.13 g./l. $Na_4P_2O_7.10H_2O$ and 0.145 g./l. $Na_2SnO_3.3H_2O$, followed by adjustment of the pH to the neutral point. Samples of the stabilized product lost only 0.56 to 0.68% of their peroxide contents when heated for 15 hrs. at 100° C. Samples of the crude feed solution, after being stabilized in the same manner, lost 3.4 to 3.5% of their peroxide contents under the same conditions.

*Example 2*

Crude aqueous hydrogen peroxide solution from the same stock used in Example 1 was vaporized substantially as described in Example 1 employing the same equipment, except that the feed material contained no added stabilizer for the peroxide. The solution was fed at a rate of 22.9 lbs./hr. during 5.5 hrs. while running the agitator at 2380 R. P. M. and supplying steam to the steam jacket at 11 p. s. i. g. (116.5° C.). The vapor temperature at the exit was 50° C. and the pressure 50 mm. Hg. About 1.0% by volume of the solution fed was removed in unvaporized form from the bottom of the vaporizer. This solution containing 2.6% of the $H_2O_2$ fed, was diluted as described in Example 1. The overall recovery of hydrogen peroxide in this solution and in the condensate product was substantially quantitative. After stabilizing the product as described in Example 1, a sample heated for 15 hrs. at 100° C. lost 0.9% of its $H_2O_2$ content.

The feed solution employed in the above examples contained organic impurities, some volatile and some nonvolatile, in an amount corresponding to a carbon content of about 0.13% by weight of the solution. About 10 to 25% of such organic impurities was found in the unvaporized solution removed from the bottom of the vaporizer.

*Example 3*

A crude unstabilized aqueous hydrogen peroxide solution made by the persulfuric acid electrolytic method and containing 34.0% $H_2O_2$ by weight was vaporized in the general manner described in the above examples. In this run, the clearance between the agitator vanes and the vaporizer wall was 0.02 in. and the agitator was rotated at 3400 R. P. M. The solution was fed at the rate of 31.0 lbs./hr. for 5 hours, during which time steam was supplied to the steam jacket at 13 p. s. i. g. (119° C.). The vapor temperature at the exit was 55° C. and the pressure 59 mm. Hg. About 0.6% by volume of the solution fed to the vaporizer was recovered as unvaporized solution which contained 1.1% of the $H_2O_2$ fed. The $H_2O_2$ recovery in the condensate was 98.0%. After stabilizing as in Example 1, a sample of the product, which contained 32.8% $H_2O_2$ by weight, lost 0.78% of its peroxide content when heated at 100° C. for 15 hrs. Crude solutions of the type used in this run, even after being stabilized as described in Example 1, generally lose most or all of their peroxide content through decomposition under these test conditions.

In Example 1, the vaporizing surface was covered at the end of the run with a thin coating of sodium pyrophosphate. In Examples 2 and 3 using feed containing no stabilizer the vaporizing surface remained clean and free from solid deposits.

In each of the above examples the pH of the crude solution fed to the vaporizer, and the pH of the product after addition of stabilizer, was adjusted to approximately the neutral point for the solution by the addition of either ammonium hydroxide or nitric acid as required, since peroxide solutions are most stable at their neutral points. When measured by means of a Beckman pH meter using a glass electrode and expressing the neutral point in terms of ordinary "pH" values, the neutral points of hydrogen peroxide solutions of 28, 35 and 50% $H_2O_2$ concentrations by weight are approximately 4.3, 3.7 and 2.6, respectively, as compared with a neutral point for water of 7. Thus, the neutral point in terms of "pH" values decreases as the concentration increases. The addition of but a small quantity of either a base or an acid to a hydrogen peroxide solution at its neutral point results in a marked change in the pH value of the solution.

Hawkinson et al. U. S. Patent 2,491,732 describes a method for effecting complete vaporization of peroxide solutions from films on a surface coated with a stabilizer. The examples of the patent show that complete vaporization of unstabilized solutions, either crude or purified, from a surface not so coated is entirely impractical due to excessive peroxide decomposition. The fact that unstabilized solutions can be vaporized by the present method in continuous operations over extended periods of time with excellent peroxide recoveries is believed to be entirely unexpected.

While the present method is outstandingly well suited for vaporizing unstabilized solutions, it can also be used effectively to vaporize stabilized solutions. If the solution contains a non-volatile stabilizer such as sodium pyrophosphate, or some other solid non-volatile material, the washing action of the unvaporized solution may or may not be sufficient to prevent entirely deposition of solids on the vaporizing surface. It has been found, however, that the washing action is sufficient despite such deposition of solids to prevent or inhibit to a worthwhile and surprising extent the accumulation of decomposition catalysts in the film and on the vaporizing surface, in view of which use of the method to vaporize stabilized solutions is definitely advantageous.

The present method is not restricted to the vaporization of solutions of any particular $H_2O_2$ content and can be employed to vaporize either dilute or concentrated solutions, e. g., solutions containing up to 70% or more $H_2O_2$ by weight.

Hydrogen peroxide is sensitive to heat and tends to decompose more or less rapidly at high temperatures. It is therefore desirable to effect vaporization at temperatures as low as possible. Ordinarily, subatmospheric pressures will be employed so that vapor temperatures above 100° C. can be avoided. Vapor temperatures below 70° C. are preferred. The vaporizing surface should of course be maintained at a temperature sufficiently high to cause rapid vaporization at the pressure employed, but temperatures substantially above that necessary to effect vaporization at the desired rate are best avoided.

The use of vertically positioned vaporizing surfaces is preferred, particularly for mechanical reasons when the film is to be turbulently agitated. The vaporizing equipment may be constructed of any of the construction materials, preferably metal, which are resistant to and do not decompose peroxide excessively in either vapor or solution form. The vaporizing surface in particular is preferably constructed of aluminum, tin or the like materials; the use of stainless steel is most preferred for this purpose. Stainless steels of A. I. S. I. numbers 304, 316, 317, 321 and 347 are especially satisfactory.

The invention can be practiced to obtain solutions substantially free from non-volatile impurities, particularly those which, though present in trace amounts, actively catalyze peroxide decomposition. Non-volatile impurities present in larger amounts may also be effectively removed. The invention can also be used as a means for concentrating peroxide solutions, e. g., by subjecting the vapors to suitable absorption or fractional condensation treatments.

I claim:

1. In a method for vaporizing hydrogen peroxide solutions from a falling film of the solution on a heated vaporizing surface, the improvement comprising continuously removing as overhead product vapors corresponding to about 95 to about 99.5% of the volume of the solution fed to said surface while continuously removing from the bottom of said surface unvaporized concentrated hydrogen peroxide solution corrresponding to about 0.5 to about 5% of the volume of the solution fed and while continuously purging said unvaporized solution from the system, the solution fed to said vaporizing surface being one containing non-volatile impurities whose accumulation on said vaporizing surface is prevented by the removal from said surface of said unvaporized solution.

2. The method of claim 1 wherein the vaporizing surface is positioned substantially vertically.

3. The method of claim 1 wherein said unvaporized solution is diluted as it is removed from the vaporizing surface by addition thereto of a diluent liquid.

4. The method of claim 1 wherein an unstabilized solution is vaporized.

5. The method of claim 1 wherein vaporization is effected from a film which is turbulently agitated.

6. The method of vaporizing hydrogen peroxide solutions comprising continuously supplying an aqueous hydrogen peroxide solution containing non-volatile impurities to the inner vertical walls of a metal vaporizer to provide a falling film of said solution on said walls, said walls being heated to a temperature effective to cause continuous vaporization on said walls of from about 95 to about 99.5% of the volume of the solution supplied to said walls, continuously removing the evolved vapors as overhead product, and continuously removing the remaining unvaporized concentrated hydrogen peroxide solution from the bottom of said walls to prevent accumulation of said impurities on said vaporizing surface, and continuously purging said unvaporized solution from the system, said unvaporized solution corresponding to about 0.5 to about 5% of the volume of the solution supplied to said walls.

7. The method of claim 6 wherein said unvaporized solution is diluted as it is removed by addition thereto of water.

8. The method of claim 6 wherein vaporization is effected from a film which is turbulently agitated.

9. The method of claim 10 wherein an unstabilized solution is vaporized.

10. The method of claim 10 wherein vaporization is effected under reduced pressure at a vapor temperature not exceeding 100° C.

References Cited in the file of this patent

UNITED STATES PATENTS

| | | |
|---|---|---|
| 1,323,075 | Levin et al. | Nov. 25, 1919 |
| 1,732,805 | D'Yarmett | Oct. 22, 1929 |
| 2,091,218 | Schmidt | Aug. 24, 1937 |
| 2,460,602 | Semon | Feb. 1, 1949 |
| 2,491,732 | Hawkinson et al. | Dec. 20, 1949 |
| 2,520,870 | Wood et al. | Aug. 29, 1950 |